United States Patent [19]
Iwata

[11] 4,434,484
[45] Feb. 28, 1984

[54] STABILIZER FOR RECORD DISCS
[75] Inventor: Yosihiko Iwata, Machida, Japan
[73] Assignee: Kabushiki Kaisha Audio-Technica, Tokyo, Japan
[21] Appl. No.: 382,173
[22] Filed: May 26, 1982
[30] Foreign Application Priority Data
May 26, 1981 [JP] Japan ................... 56-80645
[51] Int. Cl.³ .................. G11B 3/62; G11B 17/02
[52] U.S. Cl. ................................... 369/271
[58] Field of Search ............... 369/270, 271, 292
[56] References Cited
U.S. PATENT DOCUMENTS
1,062,579 5/1913 Aylsworth ................. 369/271
4,065,135 12/1977 Doughty .................... 369/270
4,367,547 1/1983 Thigpen .................... 369/271
FOREIGN PATENT DOCUMENTS
60554 9/1982 European Pat. Off. ........... 369/292
55-38654 3/1980 Japan ........................... 369/271
56-34473 1/1981 Japan ........................... 369/271

Primary Examiner—Steven L. Stephan
Attorney, Agent, or Firm—Welsh & Katz

[57] ABSTRACT

A record disc stabilizer is provided which is detachably placed on the turntable of a record player to hold a record disc placed thereon by attraction for securement. The stabilizer comprises a solid disc having a center opening and having an axial length which is less than the length of the centering spindle on the turntable, and an upper and a lower plate which cover the upside and the downside of the center opening formed in the disc to define an air tight air chamber therebetween. Annular elastic seals are mounted around the outer periphery, the inner periphery and on the upper surface of the disc to define an air space between the record disc, the upper surface of the disc and the elastic seals. The air space may communicate with the air chamber, to which a negative pressure may be applied to hold the record disc by attraction.

7 Claims, 10 Drawing Figures

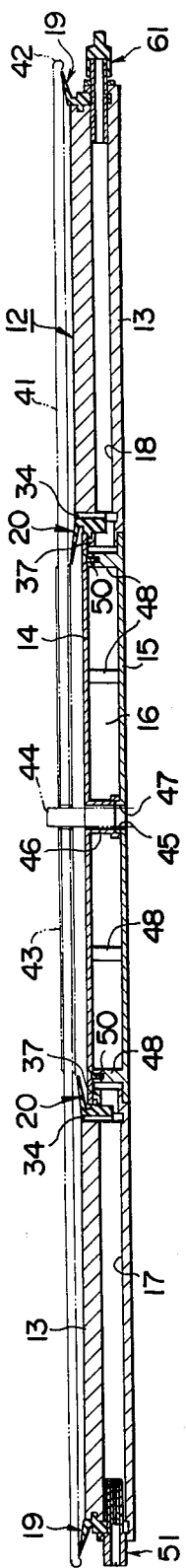
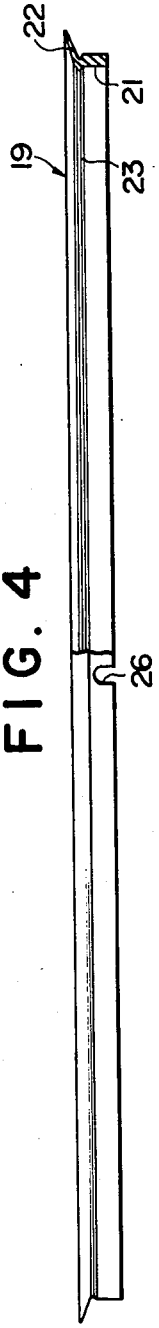
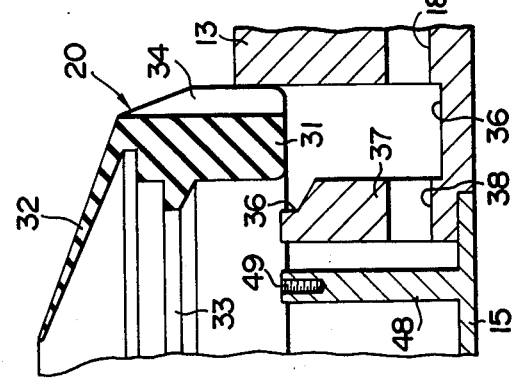
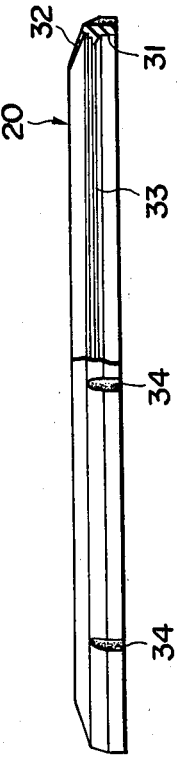
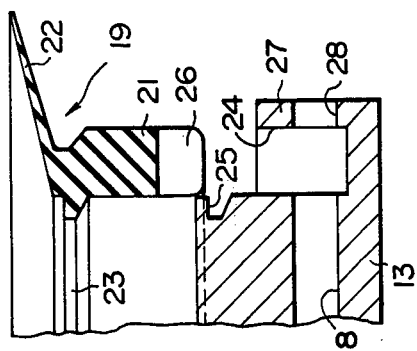

STABILIZER FOR RECORD DISCS

FIELD OF THE INVENTION

The invention relates to a stabilizer which is used to mount fixedly a record disc on the turntable of a record player, and more particularly, to a record disc stabilizer which is placed on the turntable in a detachable manner to hold a record disc firmly against it under a negative pressure to prevent any oscillation and to correct any warp of the disc.

Recent record discs are formed of vinyl chloride material, which is pliable and vulnerable to heat. Accordingly, a degree of warp may be produced during their manufacture, and a significant degree of warp may occur under room temperature if they are not properly stored. The presence of a warp in the disc produces low range noises upon playback of the disc. The noises have frequencies below about 5 Hz, and are not directly audible, but cause a cross modulation distortion, which degrades the quality of the sound being reproduced. It is also to be noted that recent record discs have a reduced thickness and a reduced weight, giving rise to the likelihood that small oscillations may be produced in the disc due to subsidiary sound insulation pressure from a loudspeaker. In particular, when a warp is present in a disc, the disc is liable to produce oscillations, which in turn cause turntable ramble noises. Such oscillations of the disc can be prevented by firmly sucuring the disc onto the turntable.

DESCRIPTION OF THE PRIOR ART

An attempt has been made in the prior art by correcting any warp in the disc which is placed on the turntable, by placing a weight on the central portion of the record disc. However, to correct for unyielding warp, a weight of an increased magnitude is required to thereby increase the loading upon the turntable, thus precluding a rotation of the turntable if an insufficient drive torque is supplied thereto.

To overcome such disadvantage, there is disclosed a record disc stabilizer in Japanese Laid-Open Patent Application No. 33,403/1982 in which a record disc is held attracted under a negative pressure. The stabilizer disclosed comprises an upper disc having a rim on its lower surface around its outer periphery, a lower disc of the same diameter as the upper disc, and a hollow cylindrical core disposed in coaxial relationship with the pair of discs. The combination of the pair of discs and the core defines an air chamber. The bottom of the core is formed with a pin opening which fits over a centering spindle formed on the turntable of a record player while the top of the core is formed with a pin which fits in a center opening formed in the record disc. A pair of annular seal members are mounted on the upper disc for close contact with the peripheral region and the central, non-recorded region of the record disc to support the record disc spaced from the upper disc. An air-tight clearance is formed between the upper disc, the record disc and the pair of seal members. An opening is formed in the upper disc to provide a communication between the clearance and the air chamber, which can be selectively connected to a source of negative pressure such as vacuum pump, and disconnected from or opened to the atmosphere. In use, the stabilizer is placed on the record player with its pin opening aligned with the centering spindle, and the center opening of the record disc is fitted over the pin formed on the stabilizer to locate the record disc. An external source of negative pressure is connected to the air chamber and the clearance, thus establishing a vacuum therein. As a result, the record disc is held attracted and secured to the stabilizer, and then the source of negative pressure is disconnected and a valve unit is utilized to disconnect the air chamber from the atmosphere, whereupon the air chamber acts as an accumulator having a negative pressure, permitting the record disc to be held attracted thereto over a prolonged period of use. Since it is possible to increase the surface over which the attraction is effected, the record disc can be firmly fixed and any warp therein may be corrected for. To remove the record disc from the stabilizer, the valve unit may be operated to open the air chamber to the atmosphere, thus releasing the negative pressure condition. However, it is to be noted that in order to increase the volume of the air chamber, the stabilizer has an increased axial height. This results in the center of gravity of the turntable shifting upward, and hence unless the weight distribution of the stabilizer is made uniform, an imbalance in the weight may prevent the turntable and hence the record disc from rotating in a flat plane, causing distortions in the reproduction of the record player.

The present invention is based on the finding that the playing time of a long playing record (LP record disc) is on the order of 30 minutes at maximum, and hence it is only necessary that the air chamber be capable of acting as an accumulator having a negative pressure during such time interval, thus allowing the volume of the air chamber and hence of the stabilizer to be reduced.

SUMMARY OF THE INVENTION

It is an object of the invention to provide a stabilizer to be placed on the turntable of a record player in order to hold a record disc placed thereon by attraction thereto under a negative pressure and which is simple and small in construction and has reduced thickness.

In accordance with the invention, there is provided a record disc stabilizer which is detachably placed on the turntable of a record player in order to hold a record disc placed thereon by attraction. The stabilizer comprises a disc body having a center opening through which the centering spindle of the turntable extends and having an axial length which is less than the length of the centering spindle, the disc body having an air chamber centrally formed therein and having a through-opening which opens into the peripheral end face of the disc body at one end and opens into the air chamber at the other end, a valve unit mounted in the through-opening adjacent ot the peripheral end face of the disc body for selectively connecting the air chamber to a source of negative pressure such as vacuum pump or for opening the air chamber of the atmosphere, an annular elastic outer seal having its one end disposed in close contact with the peripheral edge of the record disc and its other end mounted on the upper surface of the disc body around its periphery, an annular elastic inner seal having its one end disposed in close contact with the lower surface of the record disc adjacent to the center thereof and its other end mounted on the upper surface of the disc body adjacent to the center thereof and around its inner periphery, the inner seal forming an air-tight space together with the record disc, the upper surface of the disc body and the outer seal, and an air passage providing a communication between the air chamber and the space.

In a preferred embodiment of the invention, the disc body comprises a solid disc having an axially extending opening centrally formed therein, and an upper and a lower plate which cover the top and the bottom of the opening. Thus, the air chamber is defined by the combination of the opening and the upper and the lower plate, while the center opening through which the centering spindle of the turntable extends is defined by a sleeve which is arranged to extend through the center of the upper and the lower plate. The outer peripheral edge of the disc is formed with an annular groove in which the lower end of the outer seal is detachably fitted while the inner peripheral edge of the disc is formed with an annular groove in which the lower end of the inner seal is detachably fitted. The upper end of the outer seal extends radially outward with an up-directed angle from the outer periphery while the upper end of the inner seal extends radially inward with an up-directed angle from the inner periphery.

Since the record disc stabilizer of the invention has an axial length which is less than the length of the centering spindle of the turntable, it follows that when the stabilizer is placed on the turntable, the centering spindle can be utilized as a guide pin which cooperates with the center opening formed in the record disc. The thickness of the stabilizer can be reduced, and this prevents the center of gravity of the turntable from shifting significantly upward when the stabilizer is mounted thereon, thus assuring a stable rotation. Since the outer and the inner seal are detachably mounted, they can be simply changed whenever the seals are sufficiently degraded to maintain the air tightness.

BRIEF DESCRIPTION OF THE DRAWINGS

FIG. 3 is a longitudinal section of the stabilizer shown in FIGS. 1 and 2;

FIG. 4 is a side elevation, partly in section, of an outer seal;

FIG. 5 is an enlarged section of essential parts of the outer seal together with part of the disc;

FIG. 6 is a side elevation, partly in section, of an inner seal;

FIG. 7 is an enlarged section of essential parts of the inner seal together with part of the disc and the lower center frame;

DESCRIPTION OF A PREFERRED EMBODIMENT

Figure 1:
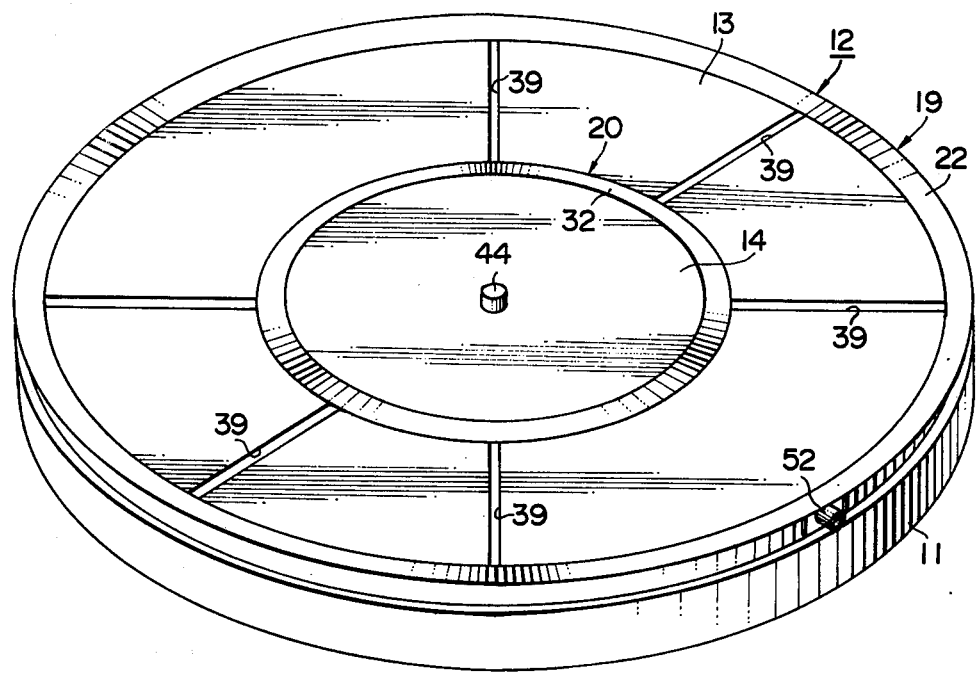
FIG. 1 is a perspective view of a record disc stabilizer according to one embodiment of the invention as placed over the turntable of a record player.
Figure 2:
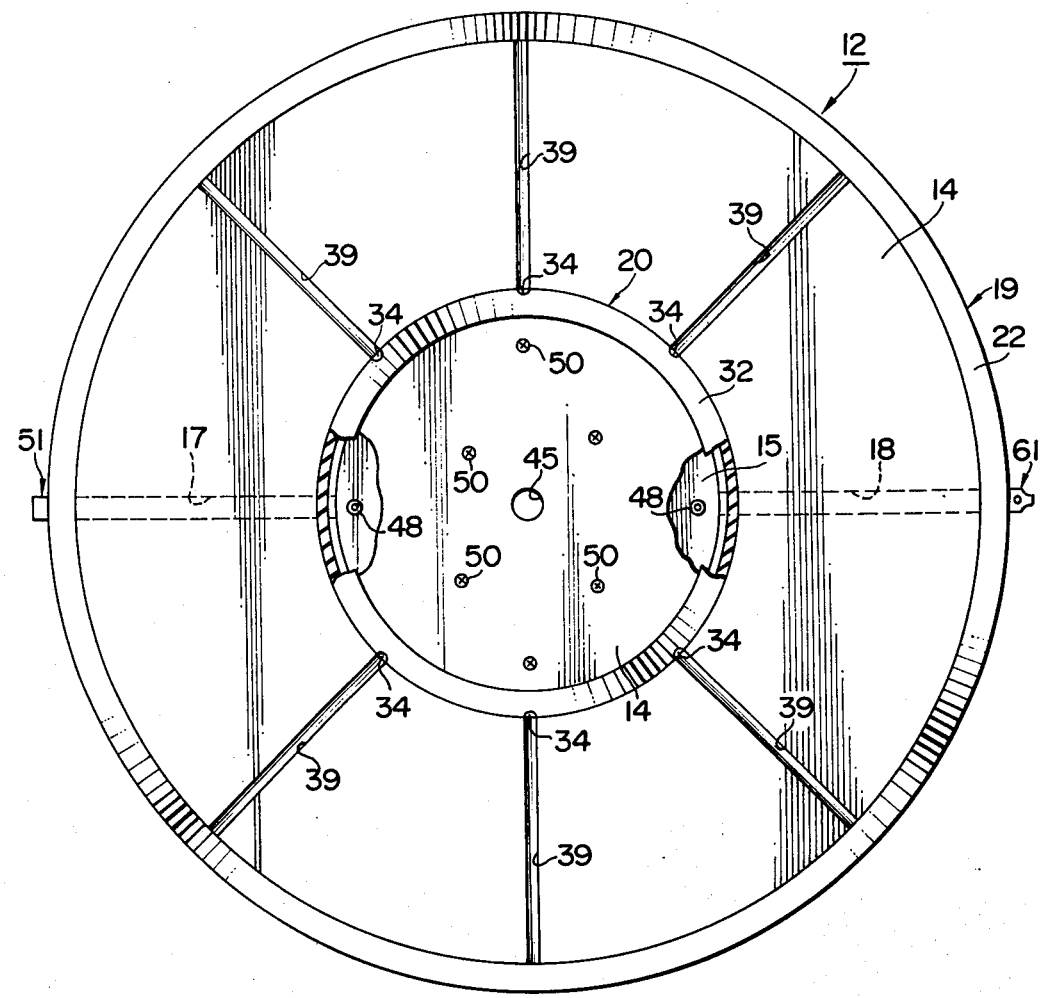
FIG. 2 is a plan view, partly broken away, of the stabilizer shown in FIG. 1.

Referring to the drawings, a record disc stabilizer according to one embodiment will now be described. First referring to FIGS. 1 to 3, a record player includes a turntable 11 on which a stabilizer according to the invention is detachably placed, the stabilizer being generally indicated by reference numeral 12. The stabilizer 12 has a diameter which is slightly less than the diameter of 30 cm LP record discs, and is also slightly less than the diameter of the turntable 11. However, it should be understood that the stabilizer 12 may have a diameter which is greater than the diameter of the turntable. The stabilizer 12 comprises a thick disc 13 having an opening extending through the center thereof, a thin disc-shaped upper center plate 14 which fits in the center opening formed in the disc 13 toward the top end thereof, and a thin disc-shaped lower center frame 15 which fits in the center opening of the disc 13 toward the bottom end thereof. The combination of the upper center plate 14 and the lower center frame defines an air tight air chamber 16 within the center opening of the disc 13. The disc 13 is formed of high purity aluminium plate of milling, and is formed with a pair of through-openings 17, 18 which extend from the outer peripheral end wall to the air chamber 16 in diametrical alignment with each other. An annular outer seal 19 formed of soft material such as neoprene rubber is detachably mounted on the outer periphery of the disc 13. Another annular inner seal 20 formed of a similar material as the outer seal 19 is detachably mounted on the inner peripheral surface of the disc 13.

As shown in detail in FIGS. 4 and 5, the outer seal 19 comprises an annular base 21, a tapered flange 22 which extends radially outward from the upper end of the base 21 with an up-directed angle, and a rib 23 which is formed on the inner peripheral surface of the base 21 with a step from the upper end face. The base 21 is forcedly inserted into a groove 24 which is formed in the disc 13 toward its outer periphery and extending from its upper surface toward its lower surface. When the base 21 is fitted into the groove 24, the rib 23 is inserted into a groove 25 which is circumferentially formed in the lateral side of the disc 13 at a position corresponding to the rib 23, thus preventing an unintended withdrawal of the outer seal 19. The base 21 is formed with a pair of notches 26 which communicate with the through-openings 17, 18. An outer end wall 27 of the disc 13 which defines the outer peripheral wall of the groove 24 has an upper end which is lower in elevation than the upper surface of the disc 13, thus facilitating a bending of the flange 22 in a downward direction. The end wall 27 is formed with a through-opening 28 which communicates with the through-openings 17, 18 and the notches 26.

As shown in detail in FIGS. 6 and 7, the inner seal 20 comprises an annular base 31, a tapered flange 32 which extends radially inward from the upper end of the base 31 with an up-directed angle, and a rib 33 formed on the inner peripheral surface of the base 31 with a step from the upper end face thereof. The outer peripheral surface of the base 31 is formed with a plurality of circumferentially spaced, axially extending flutes 34. The base 31 is forcedly inserted into a groove 35 which is formed in the upper surface of the disc 13 toward its inner periphery and which extends vertically downward toward the lower surface thereof. The rib 33 is inserted into a groove 36 which is formed in the inner lateral side of the disc 13 whenever the base 31 is fitted into the groove 35. The base 31 has an axial length which is less than the depth of the groove in which it is fitted so that an air space to permit an air stream is left in the bottom of the groove 35 when the base 31 is inserted into the groove 35. An inner end wall 37 of the disc 13 which defines the inner peripheral wall of the groove 35 is lower in elevation than the upper surface of the disc 13, and is shaped to be level with the upper end face of the rib 33 whenever the rib 33 fits in the groove 36, thereby allowing the peripheral portion of the center plate 14 to be carried by the upper end faces of the rib 33 and the inner end wall 37. It will be seen that the end wall 37 is formed with a through-opening 38 which communicates with the through-openings 17, 18.

The outer end of the flange 22 of the outer seal 19 and the inner end of the flange 32 of the inner seal 20 are normally situated above the upper surface of the disc 13. The flange 22 is adapted to be disposed in close contact with an outer peripheral edge of a record disc 41 shown in phantom line, including a guide groove 42, while the flange 32 is adapted to be disposed in close contact with a non-recorded area of the record disc 41 which is adjacent to a label.

As shown in FIG. 3, both the upper center plate 14 and the lower center frame 15 are centrally formed with sleeves 46, 47 in an integral manner to define a central bore 45 through which the centering spindle 44 of the turntable extends. In the present embodiment, the upper sleeve 46 has its lower end enlarged in diameter to be a tight fit over the other sleeve 47. It should be understood that the central bore may be defined by a single sleeve extending through axially aligned openings formed in the central regions of the center plate and the center frame. A plurality of suitably spaced stanchions 48 are fixedly mounted on the upper surface of the lower center frame 15 and have axially extending threaded bores 49 formed centrally in their upper ends. The sleeve 46 and the stanchions 48 have a height which is sufficient to hold the upper center plate 14 and the lower center frame 15 in close engagement with each other when the rib 33 is fitted into the groove 36. The upper center plate 14 is formed with threaded bores which are aligned with the threaded bores 49 formed in the individual stanchions 48, and are secured in place by inserting screws 50 through these threaded bores into the threaded bores 49 of the stanchions 48. To enhance the air tightness of the air chamber 16, grease or the like may be applied to the abutting surfaces of the sleeves 46, 47 and to the abutting surfaces between the upper center plate 14, the lower center frame 15 and the disc 13. A plurality of radially extending grooves 39 are formed in the upper surface of the upper center plate 14 and have their one end aligned with the flutes 34 formed in the inner seal 20.

Figure 8:
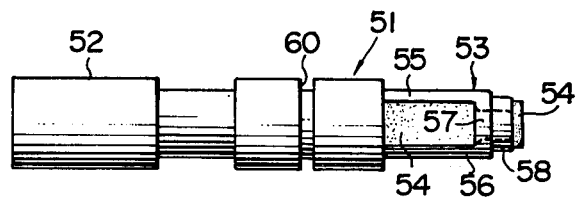
FIG. 8 is a plan view of a check valve.
Figure 9:
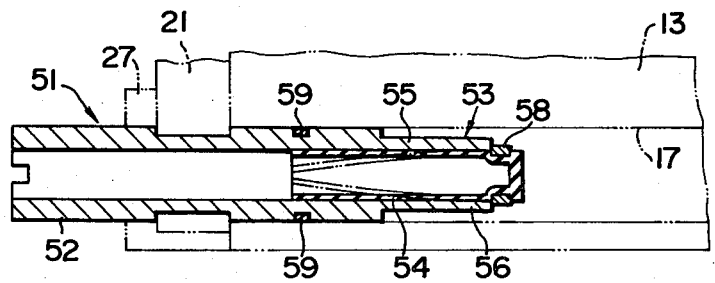
FIG. 9 is a longitudinal section of the check valve shown in FIG. 8.

A check valve unit 51 is inserted to extend through the through-opening 28 formed in the outer end wall 27 and through the notch 26 formed in the outer seal 19 into the through-opening 17. As shown in FIGS. 8 and 9, the check valve unit 51 comprises a cylinder 52 which is inserted into the through-openings 28 and 17 in a hermetically sealed manner, a frame 53 formed by an end portion of the cylinder 52 which is located within the through-opening 17 and having an outer diameter which is sequentially stepped, and a valve body 54 formed of soft material such as neoprene rubber which is retained within the frame 53. The frame 53 includes a pair of frame portions 55, 56 which axially extend from the end of the cylinder 52 and which are spaced apartt by an angle of about 180°, and a link frame 57 having its respective ends secured to the free end of the individual frame portions 55, 56. The link frame 57 is centrally formed with an opening through which the valve body 54 extends. The valve body 54 is in the form of a closed end cylinder having an outer diameter which is substantially greater than the inner diameter of the cylinder 52, with its bottom portion extending outside of the opening formed in the link frame 57 and with a retaining ring 58 firmly secured around the projecting bottom portion to prevent a withdrawal of the valve body 54. The remote end of the valve body 54 which is open is inserted into the cylinder 52 so that its peripheral wall bears against the cylinder 52 in an air tight manner. It will be noted that in the region of the frame 53 which is located within the through-opening 17, its outer wall is formed with an annular groove 60 for receiving a seal ring 59 therein.

Figure 10:
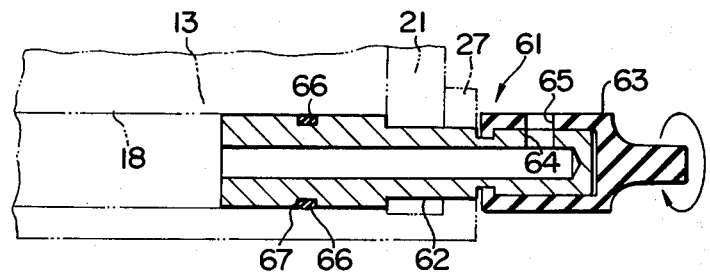
FIG. 10 is a longitudinal section of a switching valve.

A switching valve unit 61 is disposed to extend through the through-opening 28 formed in the outer end wall 27 and through the notch 26 formed in the outer seal 19 into the through-opening 18. As shown in detail in FIG. 10, the switching valve unit 61 comprises a cylinder 62 having its one end inserted into the through-openings 28, 18 in an air tight manner, and a cap 63 formed of soft material such as neoprene rubber and rotatably disposed around the other end of the cylinder 62 which projects externally of the through-opening 28. In its other end, the peripheral wall of the cylinder 62 is formed with an opening 64 which radially extends therethrough, and the cap 63 is formed with an opening 65 which selectively opens or closes the opening 64 as the cap 63 is turned. In a region located within the through-opening 18, the cylinder 62 is peripherally formed with an annular groove 67 which receives a seal ring 66.

In operation, the stabilizer 12 is set in place on the turntable 11 before beginning a record disc playing operation. Since the stabilizer 12 has a thickness which is less than the length of the centering spindle 44 on the turntable 11, the spindle 44 projects from the central bore 45 above the stabilizer. By way of example, the spindle 44 normally has a length of 15 mm while the stabilizer 12 may have a thickness of about 9.5 mm. Thus, the spindle projects above the stabilizer 12 for a length of about 5.5. mm, whereby the spindle can be utilized as a guide pin for the record disc 41. The record disc 41 may be placed on top of the stabilizer 12 with the spindle projecting above the stabilizer 12 acting as a guide. Thereupon, a hermetic seal is achieved between the record disc 41 and the upper surface of the disc 13 by the provision of the outer and the inner seal 19, 20. The cap 63 may then be turned to displace the opening 65 formed therein out of register from the opening 64 to close the switching valve unit 61. The cylinder 52 of the check valve unit 51 may then be connected to a hose (not shown) of a vacuum pump, and the pump may be operated. A negative pressure supplied from the vacuum pump causes the valve body 54 to de deformed into a collapsed condition as indicated in phantom line in FIG. 9, whereby the air present within the air chamber 16 is withdrawn through the opening 17 to reduce the pressure prevailing therein. In addition, the air is also withdrawn from the space between the record disc 41 and the upper surface of the disc 13 through the flutes 34 formed in the inner seal 20, producing a negative pressure therein. Accordingly, the record disc 41 is firmly held attracted to the disc 13, correcting for any warp which the record disc 41 may exhibit. After the attracting effect has been confirmed, the check valve unit may be disconnected from the vacuum unit, and the cylinder 52 may be opened to the atmosphere, whereby the pressure differential allows the valve body 54 to return to its solid line configuration shown in FIG. 9, isolating the through-opening 17 from the atmosphere to thereby maintain the negative pressure prevailing therein. Since the air chamber 16 acts as a negative pressure accumulator having an increased capacity, any flow of a small amount of air through the abutting regions between the seals and the record disc 41 does not interfere with the attracting effect upon the record disc 41, which is maintained attracted over a prolonged period of time. Experiments have shown that the record disc 41 can be satisfactorily held attracted for a long interval which exceeds the playing time of one surface of an LP record disc or for an interval of about 45 minutes.

As the turntable 1 rotates, the stabilizer 12 rotates together with the turntable 11 without producing any slippage owing to the frictional resistance which results from the gravity of the stabilizer. When it is desired to remove the record disc 41 from the stabilizer 12 upon completing the playing operation, the cap 63 may be turned to bring the opening 65 into register with the opening 64, thus opening the valve unit 61. This allows the air to be withdrawn into the air chamber 16 through the through-openings 18, 38, and the air is also introduced into the space between the record disc 41 and disc 13 through the flutes 34, thus releasing the attracting effect produced by the negative pressure. The groove 39 formed in the upper surface of the upper center plate 14 contributes to accelerating the termination of the attracting effect, permitting the record disc 41 to be removed within a reduced length of time.

The upper surface of the disc 12 may be slightly tapered so that a downward inclination toward the center is produced. This improves the compatibility with discs containing warps.

What is claimed is:

1. A record disc stabilizer adapted to be detachably placed on the turntable of a record player for holding a record disc placed thereon attracted thereto for securement; comprising a disc body having a central bore through which a centering spindle on the turntable extends and having an axial length which is less than the length of the centering spindle, the disc body being centrally formed with an air chamber therein and also having a through-opening formed therein one end of which opens into the outer peripheral end face of the disc body and the other end of which opens into the air chamber;

a valve unit mounted in the through-opening of the disc body adjacent to its outer peripheral end face for selectively connecting the air chamber with a source of negative pressure such as vacuum pump or opening the air chamber to the atmosphere;

an annular elastic outer seal having its one end disposed in close contact with the outer peripheral edge of the record disc and its other end mounted in the upper surface of the disc body adjacent to its outer periphery;

an annular elastic inner seal having its one end disposed in close contact with the surface of the record disc adjacent to the center thereof and its other end mounted in the upper surface of the disc body adjacent to the center thereof, the outer and the inner seal cooperating with the record disc and the upper surface of the disc body to define an air tight space therebetween;

and an air passage for providing a communication between the air chamber and the air space.

2. A record disc stabilizer according to claim 1 in which the disc body comprises a solid disc having an opening centrally therein which axially extends therethrough, and an upper and a lower plate which cover the upside and the downside of the opening, the air chamber being defined by the opening and the upper and the lower plate, the central bore being defined by a sleeve which extends through the center of the upper and the lower place.

3. A record disc stabilizer according to claim 1 in which the lower end of the outer seal is detachably fitted into a groove formed in the upper surface of the disc body adjacent to its outer periphery, the upper portion of the outer seal extending radially outward with an up-directed angle, the lower end of the inner seal being detachably fitted into a groove formed in the disc body at a boundary between the inner periphery thereof and the air chamber, the upper portion of the inner seal extending radially inward with an up-directed angle.

4. A record disc stabilizer according to claim 1 in which the through-opening comprises a first and a second through-opening disposed in diametrical alignment and extending from the peripheral end face of the disc body to the air chamber, the valve unit comprising a check valve unit which is effective to withdraw air from within the air chamber and the air space whenever the source of negative pressure connected to the valve unit is operated and which isolates the air chamber and the air space from the atmosphere whenever the source of negative pressure is inoperative, the check valve unit being connected to the first through-opening and a switching valve unit which selectively connects the air chamber and the air space with the atmosphere which is connected to the second through-opening.

5. A record disc stabilizer according to claim 1 in which the upper surface of the disc body located intermediate the outer and the inner seal is formed with radially outwardly extending air channel grooves which have their one end disposed in communication with flutes.

6. A record disc stabilizer according to claim 1 in which the upper surface of the disc body in the region of the air chamber is lower in elevation than the surface of the disc body adjacent to its outer periphery in order to provide a clearance which allows a downward bending of the upper portion of the inner seal.

7. A record disc stabilizer according to claim 2, further including a plurality of space stanchions disposed between the upper and the lower plate, the length of the stanchions and the sleeve being chosen to locate the upper surface of the upper plate at an elevation below the upper surface of the disc body.

* * * * *

UNITED STATES PATENT AND TRADEMARK OFFICE
CERTIFICATE OF CORRECTION

PATENT NO. : 4,434,484
DATED : February 28, 1984
INVENTOR(S) : Yosihiko Iwata

It is certified that error appears in the above-identified patent and that said Letters Patent is hereby corrected as shown below:

Column 1, line 29, "sucuring" should be --securing--.

Column 2, line 54, "ot" should be --to--.

Column 2, line 57, "of" should be --to--.

Column 4, line 13, "of" (1st occurr.) should be --by--.

Column 5, line 58, "apartt" should be --apart--.

Column 6, line 49, "de" should be --be--.

Column 7, line 10, "1" should be --11--.

Column 7, line 21, insert --the-- before "disc".

Signed and Sealed this

Second Day of October 1984

[SEAL]

Attest:

GERALD J. MOSSINGHOFF

*Attesting Officer*     *Commissioner of Patents and Trademarks*